US012411431B2

(12) United States Patent
Tagawa et al.

(10) Patent No.: US 12,411,431 B2
(45) Date of Patent: Sep. 9, 2025

(54) CHARGING SYSTEM AND IMAGE FORMING SYSTEM

(71) Applicant: FUJIFILM Business Innovation Corp., Tokyo (JP)

(72) Inventors: Yuki Tagawa, Kanagawa (JP); Yoshiyuki Hayashi, Kanagawa (JP); Yukimi Kawabata, Kanagawa (JP); Kenta Yamakoshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/444,753

(22) Filed: Feb. 18, 2024

(65) Prior Publication Data

US 2025/0053110 A1 Feb. 13, 2025

(30) Foreign Application Priority Data

Aug. 8, 2023 (JP) ................................ 2023-129638

(51) Int. Cl.
*G03G 15/00* (2006.01)
*G03G 15/02* (2006.01)

(52) U.S. Cl.
CPC ... *G03G 15/0225* (2013.01); *G03G 2215/021* (2013.01)

(58) Field of Classification Search
CPC .................................................. G03G 15/0225
(Continued)

(56) References Cited

U.S. PATENT DOCUMENTS 7,756,439 B2 * 7/2010 Kosuge ................ G03G 15/025 399/100
8,934,808 B2 * 1/2015 Amemiya .......... G03G 15/0225 399/100
(Continued)

FOREIGN PATENT DOCUMENTS

JP 2003140449 5/2003
JP 2007347912 * 12/2004
(Continued)

OTHER PUBLICATIONS

"Search Report of Europe Counterpart Application", issued on Jul. 18, 2024, pp. 1-9.
(Continued)

*Primary Examiner* — Hoan H Tran
(74) *Attorney, Agent, or Firm* — JCIPRNET

(57) ABSTRACT

A charging system includes a charging member that rotates while following a rotating image holding body and that charges the image holding body, a removing member that rotates while following the rotating charging member in a state of being arranged at a contact position in contact with the charging member and that removes an adhered deposit adhered to the charging member, a moving member that moves the removing member to a separation position separated from the charging member and the contact position, and at least one processor, in which the processor is configured to cause the removing member to remove the adhered deposit adhered to the charging member only for a removal time by controlling the moving member to move the removing member arranged at the separation position to the contact position at a time determined in advance.

14 Claims, 14 Drawing Sheets

(58) Field of Classification Search
USPC .............................................. 399/91, 98–100
See application file for complete search history.

(56) References Cited

U.S. PATENT DOCUMENTS

| | | | | |
|---|---|---|---|---|
| 8,953,971 | B2 * | 2/2015 | Hayashi ............. | G03G 15/0225 399/176 |
| 9,176,456 | B2 * | 11/2015 | Tsuji .................. | G03G 15/0225 |
| 2008/0025753 | A1 | 1/2008 | Yamamoto et al. | |
| 2008/0292354 | A1 | 11/2008 | Shinkawa et al. | |
| 2009/0060554 | A1 | 3/2009 | Kosuge et al. | |

FOREIGN PATENT DOCUMENTS

| | | |
|---|---|---|
| JP | 2007193207 | 8/2007 |
| JP | 2008203366 | 9/2008 |
| JP | 2009258522 | 11/2009 |

OTHER PUBLICATIONS

"Office Action of Europe Counterpart Application", issued on Jul. 2, 2025, p. 1-p. 6.

* cited by examiner

FIG. 9

| | | REMOVAL TIMING OF ADHERED DEPOSIT | REMOVAL TIME 〔sec〕 | CHANGE IN VOLUME RESISTIVITY 〔Ω·cm〕 | THICKNESS OF ADHERED DEPOSIT 〔μ m〕 | GRADE OF DENSITY UNEVENNESS |
|---|---|---|---|---|---|---|
| EXAMPLE 1 | INTERMITTENT CLEANING | 50 〔kPV〕 | 120 | 0.1 | 0.0 | A |
| EXAMPLE 2 | INTERMITTENT CLEANING | 5 〔kPV〕 | 60 | 0.5 | 0.5 | A |
| EXAMPLE 3 | INTERMITTENT CLEANING | 100 〔PV〕 | 10 | 1.7 | 1.0 | A |
| EXAMPLE 4 | INTERMITTENT CLEANING | 200 〔kcycle〕 | 120 | 0.2 | 0.2 | A |
| EXAMPLE 5 | INTERMITTENT CLEANING | ⊿1.0 〔log Ω〕 | 60 | 0.4 | 0.4 | A |
| COMPARATIVE EXAMPLE | CONSTANT CONTACT | AT ALL TIMES | AT ALL TIMES | 2.6 | 2.0 | C |

CHARGING SYSTEM AND IMAGE FORMING SYSTEM

CROSS-REFERENCE TO RELATED APPLICATIONS

This application is based on and claims priority under 35 USC 119 from Japanese Patent Application No. 2023-129638 filed Aug. 8, 2023.

BACKGROUND

(i) Technical Field

The present invention relates to a charging system and an image forming system.

(ii) Related Art

An image forming apparatus described in JP2007-193207A has an image holder on which an image is formed, a charging roll that charges the image holder, a first support unit that supports the charging roll, a cleaning member that cleans the charging roll, a second support unit that supports the first support unit, and a moving unit that moves the second support unit, in which the second support unit supports the first support unit such that the charging roll moves to a print position in contact with an image holder surface and a retracted position not in contact with the image holder surface in response to the movement of the second support unit.

SUMMARY

There is a removing member that removes an adhered deposit adhered to the rotating charging member. The removing member is in contact with the charging member at all times and removes the adhered deposit adhered to the charging member by rotating while following the rotating charging member.

However, the adhered deposit remaining on the charging member without being removed by the removing member is pressed against the charging member by the removing member that rotates while following the charging member as being in contact therewith. Accordingly, a layer of the adhered deposit is formed on the charging member in some cases.

Aspects of non-limiting embodiments of the present disclosure relate to a charging system and an image forming system that suppress formation of a layer of an adhered deposit to a charging member compared to a case where a removing member rotating while following the charging member is in contact with the charging member at all times.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a charging system including a charging member that rotates while following a rotating image holding body and that charges the image holding body, a removing member that rotates while following the rotating charging member in a state of being arranged at a contact position in contact with the charging member and that removes an adhered deposit adhered to the charging member, a moving member that moves the removing member to a separation position separated from the charging member and the contact position, and at least one processor, in which the processor is configured to cause the removing member to remove the adhered deposit adhered to the charging member only for a removal time by controlling the moving member to move the removing member arranged at the separation position to the contact position at a time determined in advance.

BRIEF DESCRIPTION OF THE DRAWINGS

Exemplary embodiment(s) of the present invention will be described in detail based on the following figures, wherein:

FIG. 9 is a drawing in which the evaluation results of the examples and the comparative example according to the first exemplary embodiment of the present disclosure are shown in a table;

DETAILED DESCRIPTION

First Exemplary Embodiment

Figure 1:
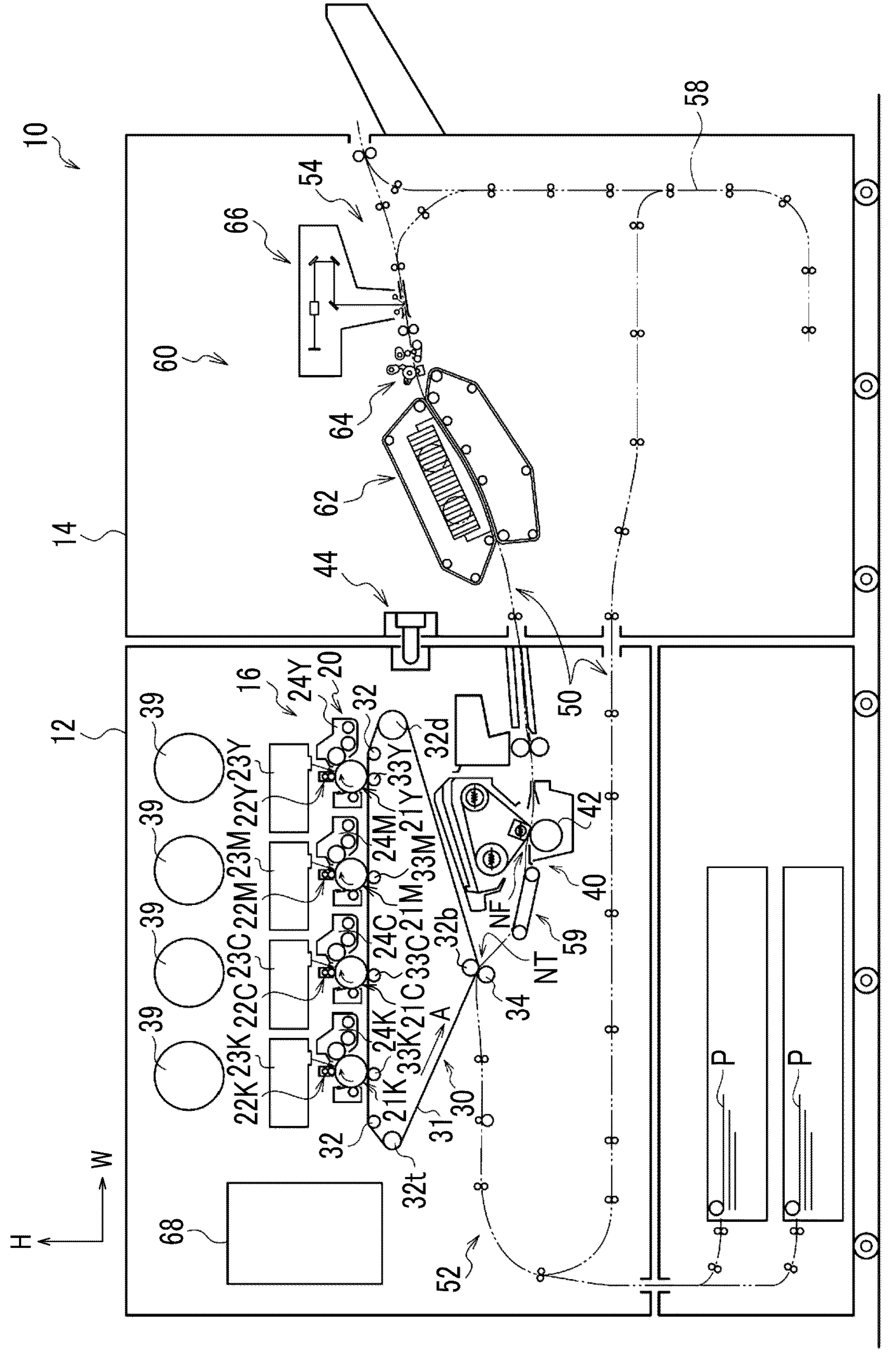
FIG. 1 is a schematic configuration view showing an image forming apparatus according to a first exemplary embodiment of the present disclosure.

An example of a charging device and an image forming apparatus according to a first exemplary embodiment of the present disclosure will be described with reference to FIGS. 1 to 9. An arrow H shown in the drawing indicates an apparatus up-down direction (vertical direction), an arrow W indicates an apparatus width direction (horizontal direction), and an arrow D indicates an apparatus depth direction (horizontal direction).

Image Forming Apparatus 10

As shown in FIG. 1, the image forming apparatus 10 is configured to include a first housing 12, a second housing 14, an image forming unit 16, a medium transport unit 50, a post-processing unit 60, and a control unit 68. The control unit 68 controls respective units (respective units or the like configuring the image forming unit 16) configuring the image forming apparatus 10. The image forming apparatus 10 is an example of an image forming system.

In addition, the first housing 12 and the second housing 14 are arranged side by side in the apparatus width direction and are connected to each other by a connecting mechanism 44.

Image Forming Unit 16

Figure 2:
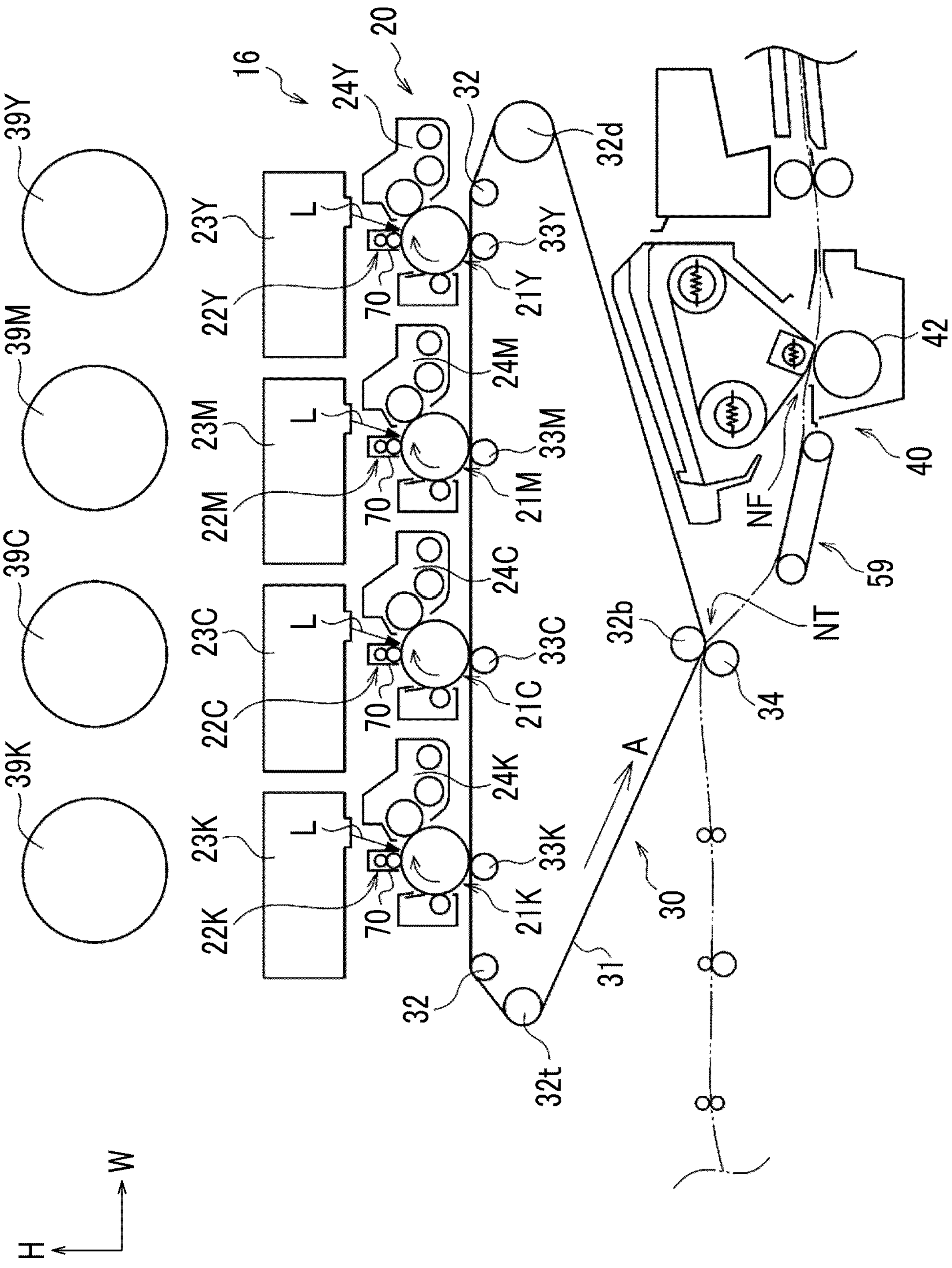
FIG. 2 is a configuration view showing an image forming unit and a transfer device included in the image forming apparatus according to the first exemplary embodiment of the present disclosure.

The image forming unit 16 includes a toner image forming unit 20 that is arranged inside the first housing 12 as shown in FIG. 1 and that forms a toner image as shown in FIG. 2 and a transfer device 30 that transfers an image formed by the toner image forming unit 20 to a sheet member P which is a recording medium. Further, the image forming unit 16 includes a fixing device 40 that fixes the toner image, which is transferred to the sheet member P, to the sheet member P. The image forming unit 16 forms an image on the sheet member P through an electrophotographic image method.

Toner Image Forming Unit 20

As shown in FIG. 2, the toner image forming unit 20 is configured to include an image holding body 21, a charging device 22, an exposure device 23, and a developing device 24. A plurality of toner image forming units 20 are included to form toner images for respective colors. In the present exemplary embodiment, in total, four colors of yellow (Y), magenta (M), cyan (C), and black (K) toner image forming units 20 are provided. In addition, the toner image forming unit 20 of each color has the same structure, and in a circumferential direction of a transfer belt 31 included in the transfer device 30, the yellow (Y), magenta (M), cyan (C), and black (K) toner image forming units 20 of respective colors are arranged in this order from an upstream side. In addition, the image holding body 21 of each color is in contact with the transfer belt 31. The toner image forming units 20 of respective colors are arranged in the apparatus width direction. In a case where it is not necessary to distinguish Y, M, C, and K, Y, M, C, and K may be omitted.

The image holding body 21 is formed in a cylindrical shape and is rotationally driven about an axis thereof by a driver (not shown). For example, a photosensitive layer having a negative charging polarity is formed on an outer peripheral surface of the image holding body 21. An overcoat layer may be formed on the outer peripheral surface of the image holding body 21.

The charging device 22 includes a charging roll 70 that is an example of a charging member which is in contact with the outer peripheral surface (photosensitive layer) of the image holding body 21, which rotates while following the rotating image holding body 21, and which negatively charges the outer peripheral surface of the image holding body 21. The charging device 22 is an example of a charging system. Details of the charging device 22 will be described later.

The exposure device 23 forms an electrostatic latent image on the outer peripheral surface of the image holding body 21. Specifically, the outer peripheral surface of the image holding body 21 charged by the charging device 22 is irradiated with modulated exposure light L according to image data. Then, the electrostatic latent image is formed on the outer peripheral surface of the image holding body 21 with irradiation of the exposure light L.

By developing an electrostatic latent image formed on the outer peripheral surface of the image holding body 21 with a developer G containing a toner T (an example of powder) and a carrier CA as a toner image, the developing device 24 forms the toner image on the outer peripheral surface of the image holding body 21. A toner cartridge 39 for replenishing the developing device 24 with the toner T is connected to the developing device 24 via a transport path (not shown). The toner cartridges 39 of respective colors are arranged side by side in the apparatus width direction above the exposure devices 23 and are individually attachable and detachable (replaceable) with respect to the first housing 12.

The transfer device 30 includes the endless transfer belt 31 to which a toner image of the image holding body 21 of each color is transferred, and the transfer belt 31 is wound around a plurality of rolls 32 to determine a posture. In the present exemplary embodiment, the transfer belt 31 is in a posture having an inverted obtuse triangle shape which is long in the apparatus width direction in a case of being viewed from a front side.

A roll **32*d* of the plurality of rolls 32 functions as a drive roll that makes the transfer belt 31 go around in an arrow A direction. In addition, a roll 32*t* of the plurality of rolls 32 functions as a tension applying roll that applies tension to the transfer belt 31. The roll 32*b* of the plurality of rolls 32 functions as a facing roll of a secondary transfer roll 34** to be described later.

Further, each primary transfer roll 33 that transfers a toner image formed on the outer peripheral surface of the image holding body 21 to the transfer belt 31 is provided on an opposite side of the image holding body 21 of each color with the transfer belt 31 sandwiched therebetween.

Further, the secondary transfer roll 34 that transfers a toner image transferred to the transfer belt 31 to the sheet member P is in contact with a top portion of the transfer belt 31 on a lower end side, which forms an obtuse angle, and a transfer nip NT is formed by the transfer belt 31 and the secondary transfer roll 34.

The fixing device 40 fixes a toner image to the sheet member P to which a toner image is transferred by the transfer device 30. In the present exemplary embodiment, the fixing device 40 fixes the toner image to the sheet member P by pressurizing the toner image while heating the toner image at a fixing nip NF.

Medium Transport Unit 50

As shown in FIG. 1, the medium transport unit 50 is configured to include a medium supply unit 52 that supplies the sheet member P to the image forming unit 16 and a medium discharge unit 54 that discharges the sheet member P on which an image is formed. Further, the medium transport unit 50 is configured to include a medium return unit 58 used in a case of forming an image on both sides of the sheet member P and an intermediate transfer unit 59 that transports the sheet member P from the transfer device 30 to the fixing device 40.

The medium supply unit 52 supplies the sheet member P one by one to the transfer nip NT of the image forming unit 16 in accordance with a transfer timing. On the contrary, the medium discharge unit 54 discharges the sheet member P, to which a toner image is fixed by the fixing device 40, outside the device. Further, the medium return unit 58 returns the sheet member P to the image forming unit 16 (medium supply unit 52) by reversing the front and back of the sheet member P in a case of forming an image on the other surface of the sheet member P having one surface to which a toner image is fixed.

Post-Processing Unit 60

As shown in FIG. 1, the post-processing unit 60 is configured to include a medium cooling unit 62 that is arranged inside the second housing 14 and that cools the sheet member P on which an image is formed, a correction device 64 that corrects the bending of the sheet member P, and an image inspection unit 66 that inspects the image.

In addition, respective units configuring the post-processing unit 60 are arranged in the medium discharge unit 54 of the medium transport unit 50, and the medium cooling unit 62, the correction device 64, and the image inspection unit 66 are arranged in this order from an upstream side in a discharge direction of the sheet member P.

Action of Image Forming Apparatus 10

Next, the outline of an image forming step and a post-processing step on the sheet member P by the image forming apparatus 10 will be described.

In a case of forming an image on the sheet member P, developing rolls (reference symbol omitted) included in the image holding body 21 and the developing device 24 are rotated, and the transfer belt 31 is made go around. Further, a pressurizing roll 42 included in the fixing device 40 is rotated, and a fixing belt (reference symbol omitted) is made go around.

Then, the image holding body 21 of each color is charged by the charging device 22 while rotating. In addition, the exposure device 23 of each color emits the exposure light L of each color according to image data and exposes the charged image holding body 21 of each color. In addition, an electrostatic latent image is formed on the outer peripheral surface of the image holding body 21 of each color. The electrostatic latent image formed on the image holding body 21 of each color is developed as a toner image with the developer G supplied from the developing device 24. Accordingly, a toner image of a corresponding color, among yellow (Y), magenta (M), cyan (C), and black (K), is formed on the image holding body 21 of each color.

Further, a toner image of each color formed on the image holding body 21 of each color is transferred in turn by the primary transfer roll 33 of each color to the transfer belt 31 that goes around. Accordingly, a toner image obtained by superimposing toner images of four colors is formed on the transfer belt 31. The toner image is transported to the transfer nip NT as the transfer belt 31 goes around. At the transfer nip NT, the toner image is transferred from the transfer belt 31 to the transported sheet member P.

The sheet member P to which a toner image is transferred is transported from the transfer nip NT of the transfer device 30 toward the fixing nip NF of the fixing device 40 by the intermediate transfer unit 59. The fixing device 40 applies heat and a pressurizing force (fixing energy) to the sheet member P passing through the fixing nip NF. Accordingly, the toner image transferred to the sheet member P is fixed to the sheet member P.

The sheet member P heated by the fixing device 40 is first cooled by the medium cooling unit 62. Next, the bending of the sheet member P is corrected by the correction device 64. Further, the presence or absence or a degree of a toner density defect, an image defect, an image position defect, and the like of a toner image fixed to the sheet member P is detected by the image inspection unit 66. Then, the sheet member P is discharged to an outside of the second housing 14 by the medium discharge unit 54.

On the other hand, in a case where an image is formed on a non-image surface (back surface) of the sheet member P, on which no image is formed (a case of two-sided printing), a transport path for the sheet member P which has passed through the image inspection unit 66 is switched from the medium discharge unit 54 to the medium return unit 58. Accordingly, the front and back of the sheet member P are reversed, and the sheet member P is sent into the medium supply unit 52. An image is formed (fixed) on the back surface of the sheet member P in a step which is the same as the step described above, and the sheet member P is discharged to the outside of the second housing 14 by the medium discharge unit 54.

Major Portion Configuration

Next, the charging device 22 will be described.

Figure 3:
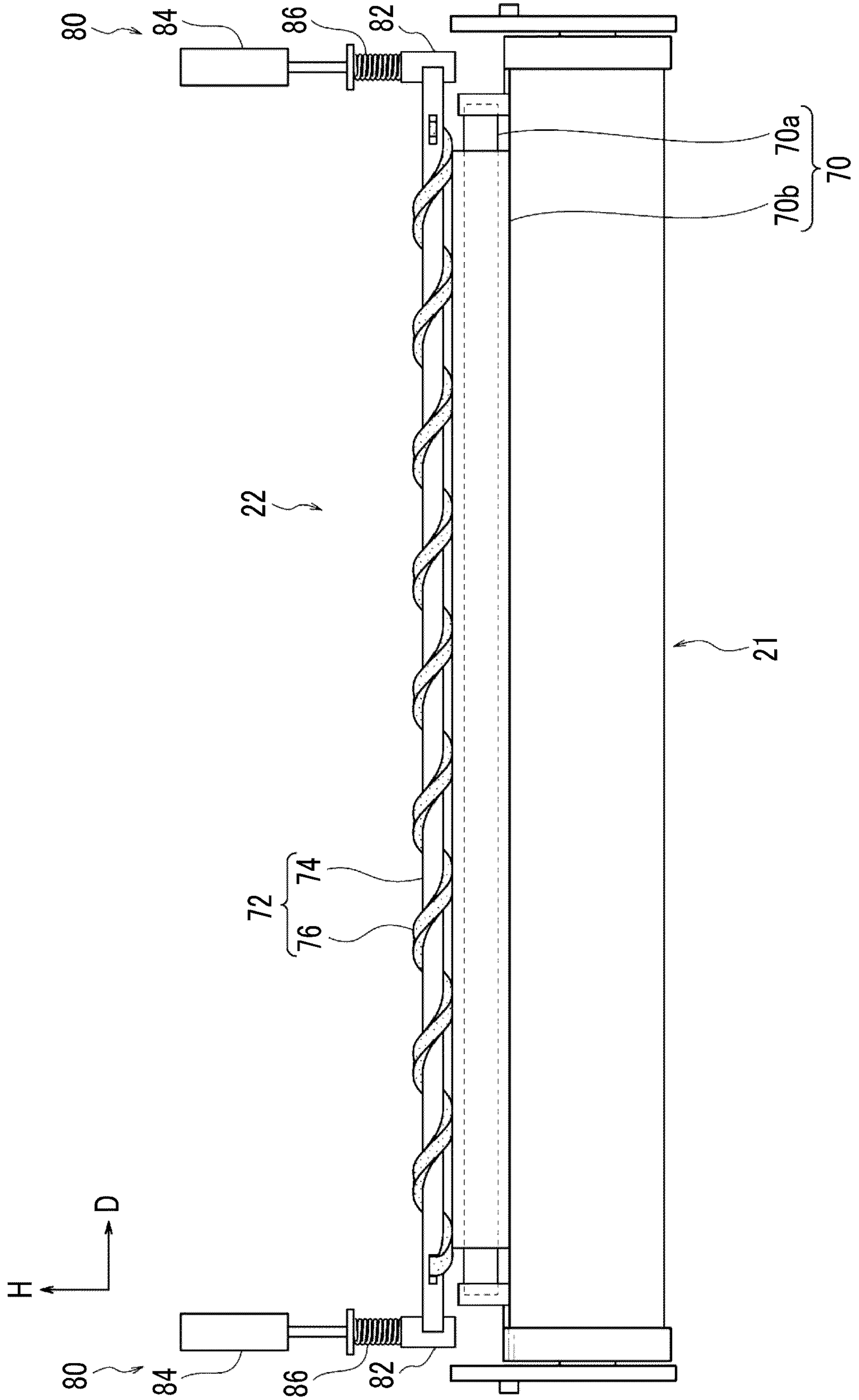
FIG. 3 is a configuration view showing a charging device according to the first exemplary embodiment of the present disclosure.

As shown in FIG. 3, the charging device 22 includes the charging roll 70 that is arranged above the image holding body 21 and that negatively charges the outer peripheral surface of the image holding body 21 and a removing member 72 that removes an adhered deposit from the surface of the charging roll 70. Further, the charging device 22 includes a moving member 80 that rotatably supports the removing member 72 and that moves the removing member 72 to a separation position separated from the charging roll 70 and a contact position in contact with the charging roll 70, and a control unit 90 (see FIGS. 6A and 6B) that controls respective units.

Charging Roll 70

As shown in FIG. 3, the charging roll 70 includes a shaft member 70*a* that is in a columnar shape extending in the apparatus depth direction and a cylindrical roll portion 70*b* through which the shaft member 70*a* penetrates. The charging roll 70 is an example of the charging member.

In addition, the roll portion 70*b* is in contact with the outer peripheral surface of the image holding body 21 from above the image holding body 21.

In the configuration, the charging roll 70 rotates while following the rotating image holding body 21. Then, as a voltage is applied from a power source to the charging roll 70 that rotates while following the image holding body 21, the charging roll 70 charges the outer peripheral surface of the image holding body 21.

Removing Member 72

As shown in FIG. 3, the removing member 72 includes a core material 74 that is in a columnar shape extending in the apparatus depth direction and a removing material 76 that is spirally wound around an outer peripheral surface of the core material 74.

In addition, the removing material 76 is in contact with the outer peripheral surface of the charging roll 70 from above the charging roll 70. Further, the core material 74 of the removing member 72 is rotatably supported by a pair of support members 82 arranged at both end portions of the removing member 72. In other words, the core material 74 is rotatably supported about an axis of the core material 74 by the support members 82.

For example, the core material 74 is formed of a resin material (for example, a polyacetal resin or the like). In addition, for example, the removing material 76 is formed by foaming a urethane resin and has a rectangular section in a free state where the removing material 76 is not wound around the outer peripheral surface of the core material 74. Then, the removing material 76 is fixed to the outer peripheral surface of the core material 74 by using a double-sided tape (not shown).

Figure 4:
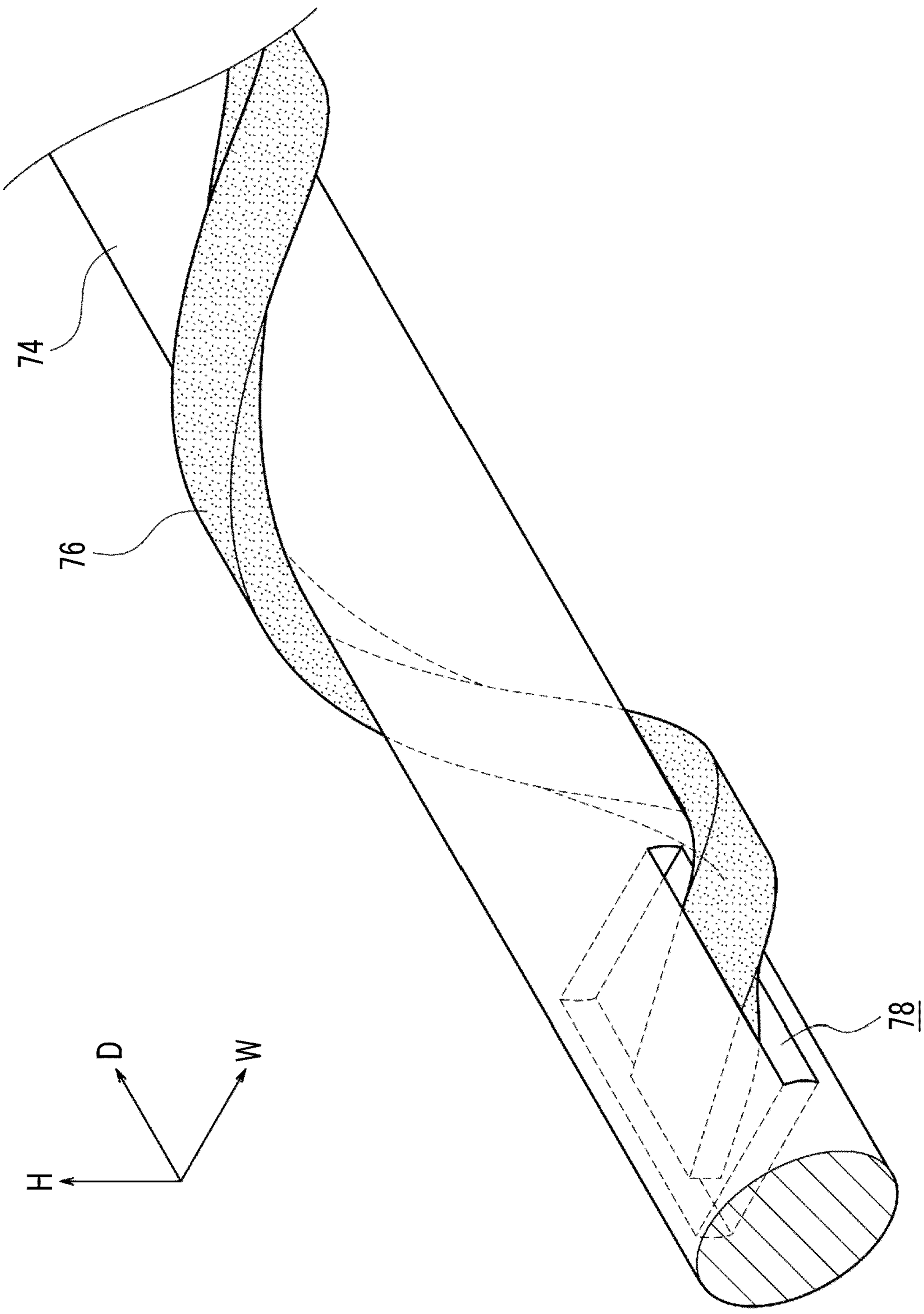
FIG. 4 is a perspective view showing an end portion of a removing member included in the charging device according to the first exemplary embodiment of the present disclosure.

As shown in FIG. 4, hole portions 78 extending in an axial direction of the core material 74 are formed respectively in both end portions of the core material 74 (only one side is shown in FIG. 4). Then, both end portions of the removing material 76 are compressed in a thickness direction and are fitted to hole portions 78.

In the configuration, as the removing material 76 comes into contact with the roll portion 70*b* of the rotating charging roll 70 and the removing member 72 rotates while following, the removing material 76 scrapes off and removes an adhered deposit adhered to the roll portion 70*b*.

Moving Member 80

As shown in FIG. 3, the moving members 80 are respectively arranged at both end portions of the removing member 72. In addition, each of the moving members 80 includes the support member 82 that rotatably supports the removing member 72, a solenoid 84 that moves the support member 82 in directions of being close to and separated away from the charging roll 70, and a biasing member 86 that biases the removing member 72 toward the charging roll 70.

The support member 82 is in a rectangular parallelepiped shape and supports the core material 74 of the removing member 72 via a bearing. The solenoid 84 is arranged above the support member 82. The biasing member 86 is a compression coil spring extending in an up-down direction and is arranged between the support member 82 and the solenoid 84.

Figure 5B:
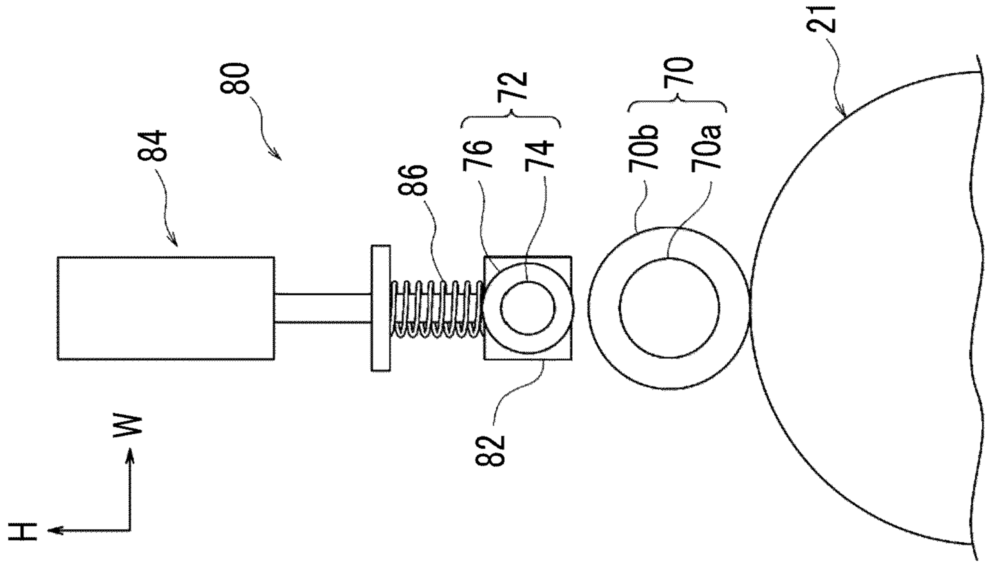
FIGS. 5A and 5B show the charging device according to the first exemplary embodiment of the present disclosure and are state views showing a state where the removing member is arranged at a contact position and a state where the removing member is arranged at a separation position.
Figure 5A:
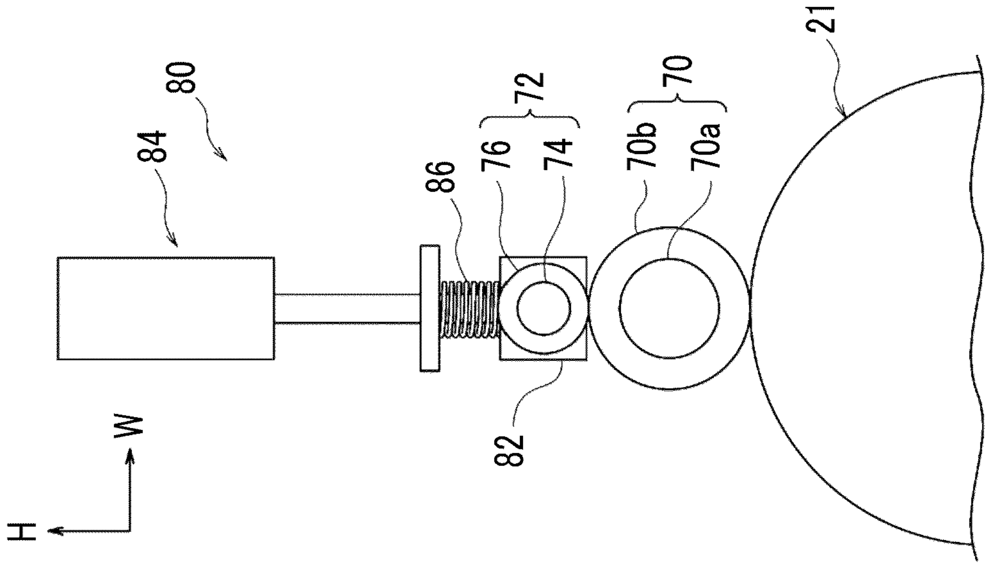

In the configuration, in a non-energized state of the solenoid 84, the moving member 80 moves the removing material 76 to the separation position separated from the charging roll 70 as shown in FIG. 5B. On the other hand, in a case where the solenoid 84 is energized, the moving member 80 moves the removing material 76 to the contact position in contact with the charging roll 70 as shown in FIG. 5A. Then, the removing member 72 moved to the contact position rotates while following the rotating charging roll 70 and scrapes off and removes an adhered deposit adhered to the charging roll 70.

Control Unit 90

Hardware Configuration of Control Unit 90

Figure 6B:
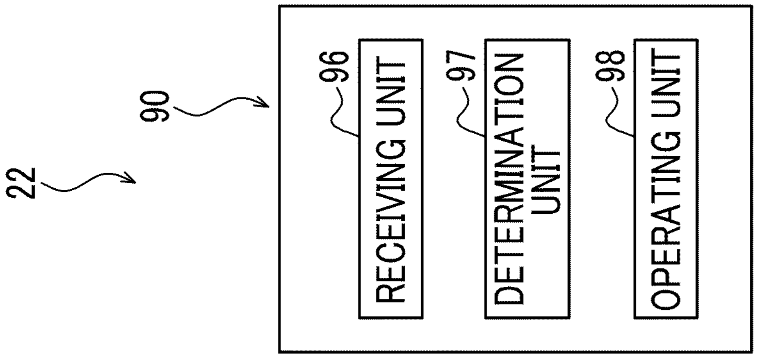
FIGS. 6A and 6B are diagrams showing a hardware configuration and a functional configuration of a control unit provided in the charging device according to the first exemplary embodiment of the present disclosure.
Figure 6A:
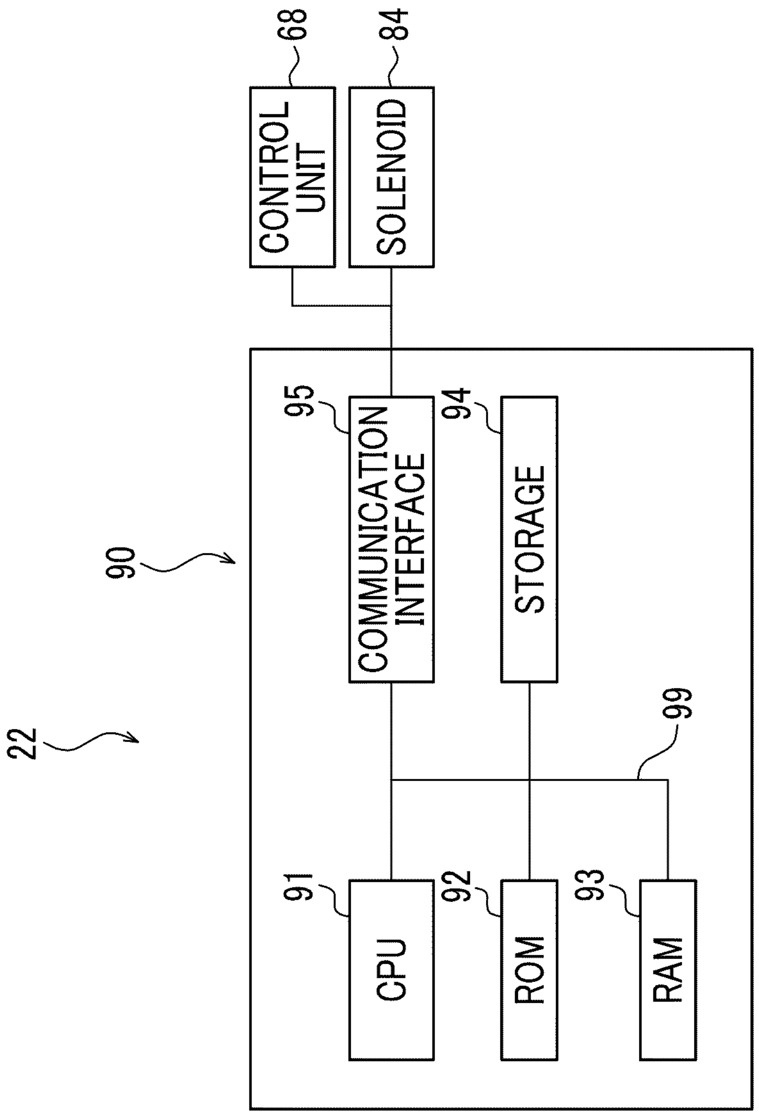

As shown in FIG. 6A, the control unit 90 has a central processing unit (CPU) 91, a read only memory (ROM) 92, a random access memory (RAM) 93, a storage 94, and a communication interface (I/F) 95. In addition, the respective configurations are communicably connected to each other via a bus 99. The CPU 91 is an example of a processor.

The CPU 91 is a central processing unit and executes various types of programs or controls respective units. That is, the CPU 91 reads the program from the ROM 92 or the storage 94 and executes a program using the RAM 93 as a work area. The CPU 91 controls each configuration and performs various types of calculation processing in accordance with the program stored in the ROM 92 or the storage 94.

In the present exemplary embodiment, for example, a drive program for energizing the solenoid 84 based on information of a print job is stored in the ROM 92 or the storage 94.

The RAM 93 temporarily stores a program or data as a work area. The storage 94 is configured by a hard disk drive (HDD) or a solid state drive (SSD) and stores various types of programs including an operating system and various types of data.

The communication interface 95 is an interface for communicating with the solenoid 84 and the like. For example, standards, such as ETHERNET (registered trademark), FDDI, and Wi-Fi (registered trademark), are used.

In a case of executing the drive program described above, the control unit 90 realizes various types of functions using the hardware resources. Next, a functional configuration of the control unit 90 in which the control unit 90 realizes various types of functions will be described.

Functional Configuration of Control Unit 90

As shown in FIG. 6B, the control unit 90 has a receiving unit 96, a determination unit 97, and an operating unit 98. Each functional configuration is realized by causing the CPU 91 to read and execute the drive program stored in the ROM 92 or the storage 94. Details of the control unit 90 will be described together with action to be described later.

Action of Major Portion Configuration

Figure 7:
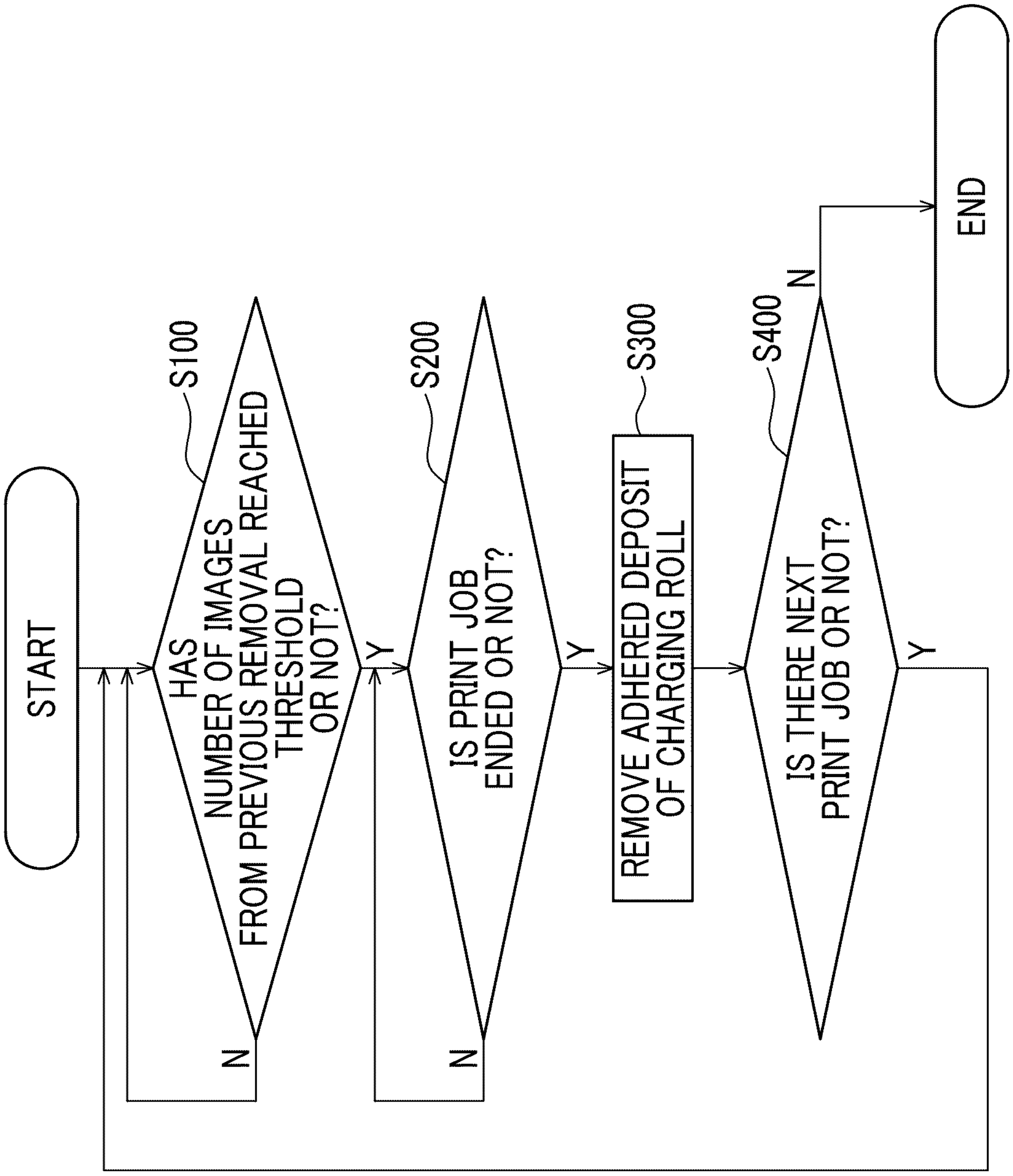
FIG. 7 is a flowchart showing a removing step of removing an adhered deposit adhered to a charging roll of the charging device according to the first exemplary embodiment of the present disclosure.

Next, a removing step of removing an adhered deposit adhered to the charging roll 70 using the removing member 72 will be described with reference to a flowchart of FIG. 7. In an initial state before entering the removing step, the removing member 72 is arranged at the separation position.

In a case where the receiving unit 96 of the control unit 90 receives information of a print job to be executed by the image forming apparatus 10 from now on from the control unit 68 of the image forming apparatus 10, in step S100, the determination unit 97 of the control unit 90 determines whether or not the number of images from the previous removal reaches a threshold based on the information of the print job.

Specifically, the determination unit 97 determines whether or not a cumulative number of images reaches the threshold in a case where a received print job is executed after the removing member 72 moves to the contact position and removes an adhered deposit of the charging roll 70. In the present exemplary embodiment, for example, the threshold of the number of images is 50,000 sheets. That is, the determination unit 97 determines whether or not the cumulative number of images reaches 50,000 sheets in a case where the received print job is executed after the removing member 72 moves to the contact position and removes the adhered deposit of the charging roll 70. In a case where the number of images reaches the threshold, processing proceeds to step S200, and in a case where the number of images does not reach the threshold, step S100 is executed again.

In step S200, the receiving unit 96 receives operating information of the image forming apparatus 10 from the control unit 68 of the image forming apparatus 10, and the determination unit 97 determines whether or not the print job has ended. In a case where the print job ends, processing proceeds to step S300, and in a case where the print job is not ended, step S200 is executed again.

In step S300, the operating unit 98 energizes the solenoid 84, and the removing member 72 at the separation position (see FIG. 5B) is moved to the contact position (see FIG. 5A) only for a time determined in advance. The removing member 72 moved to the contact position rotates while following the rotating charging roll 70 and scrapes off and removes an adhered deposit adhered to the charging roll 70. In the present exemplary embodiment, for example, a time for which the removing member 72 is at the contact position is 120 [sec]. That is, a removal time for removing the adhered deposit is 120 [sec]. In a case where 120 [sec] is reached after the removing member 72 moves to the contact position, the operating unit 98 brings the solenoid 84 into a non-energized state and moves the removing member 72 at the contact position (see FIG. 5A) to the separation position (see FIG. 5B). In a case where the removing member 72 moves to the separation position, processing proceeds to step S400.

In step S400, the receiving unit 96 receives presence or absence information of a print job to be executed by the image forming apparatus 10 from now on from the control unit 68 of the image forming apparatus 10. In a case where there is a print job, processing returns to step S100 again, and the step described above is executed. On the other hand, in a case where there is no print job, an operation of an example is ended.

Actual Device Test

Herein, the following actual device test is conducted using DocuCentre-VI C7771 manufactured by FUJIFILM Business Innovation Corp. Hereinafter, evaluation conditions, evaluation items, and evaluation results of the actual device test will be described.

(1) Example 1

Evaluation Conditions

An image having an image density (area coverage) of 80% is printed using black on 250,000 sheets of A4 size paper.

In Example 1, a threshold of the number of images is 50,000 sheets (50 kPV). That is, the removing member 72 is moved to the contact position for each of 50,000 sheets (50 kPV). A removal time is 120 [sec]. That is, a contact state of the removing member 72 is maintained for 120 [sec].

Evaluation Items

The volume resistivity of the charging roll 70 is measured for each of 50,000 sheets (50 kPV). The target value of the volume resistivity of the charging roll 70 after printing 250,000 sheets is less than 10.5 [Ω·cm].

As for the volume resistivity, a sheet-like measurement sample is collected from a measurement target. A voltage adjusted such that an electric field (applied voltage/composition sheet thickness) reached 1,000 V/cm is applied to the measurement sample for 30 seconds by using a measuring jig (R12702A/B resistivity chamber: manufactured by Advantest Corporation) and a high resistance meter (R8340A digital high resistance/micro ammeter: manufactured by Advantest Corporation) in conformity with JIS K 6911 (1995), and the volume resistivity is calculated from a flowing current value according to the following equation.

Volume resistivity (22·cm)=(19.63×applied voltage (V))/(current value (A)×measurement sample thickness (cm))

Further, after printing 250,000 sheets (250 kPV), a change in the volume resistivity of the charging roll 70 is derived. The target value of the change in the volume resistivity after printing 250,000 sheets (250 kPV) is less than 2.0 [Ω·cm].

In addition, after printing 250,000 sheets (250 kPV), the thickness of an adhered deposit (discharge products, external additives, and the like) deposited on the charging roll 70 is measured through SEM observation. The target value of the thickness of a layer of the adhered deposit after printing 250,000 sheets (250 kPV) is less than 2.0 [μm].

Further, the grade of density unevenness of an output image caused by contamination of the charging roll 70 is evaluated on a four-point scale of A, B, C, and D. As for the grade of density unevenness, the output image is visually checked, a level acceptable for the product is "A", and "B", "C", and "D" are levels unacceptable for the product in ascending order of an unacceptable degree.

Evaluation Results

Figure 8:
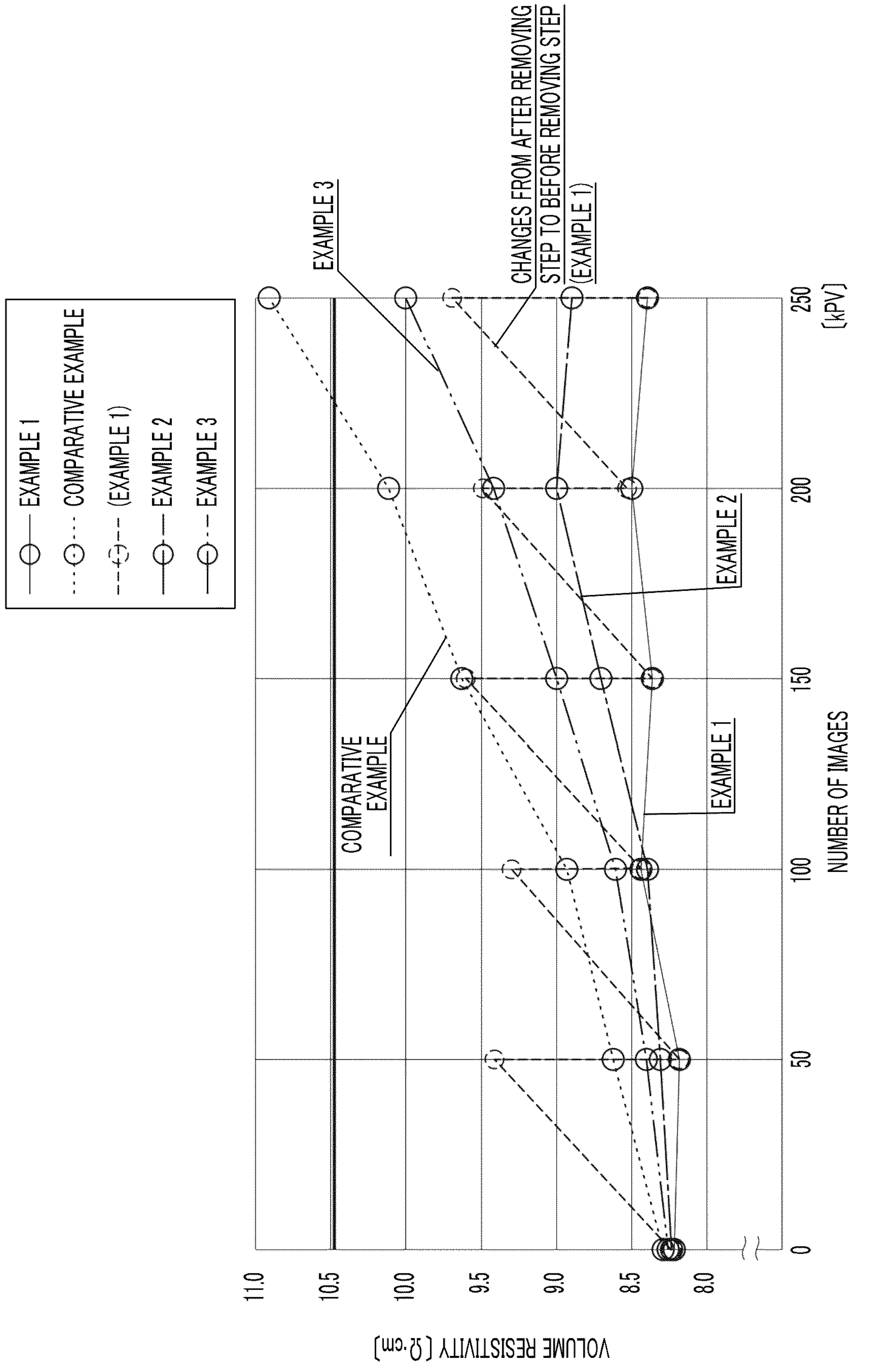
FIG. 8 is a drawing in which evaluation results of examples and a comparative example according to the first exemplary embodiment of the present disclosure are shown in a graph.

A change in the volume resistivity of the charging roll 70 of Example 1 is described in the graph shown in FIG. 8. The horizontal axis in the graph is the number of prints (the number of images), and the vertical axis is the volume resistivity. A solid line in the graph indicates a change in the volume resistivity of the charging roll 70 of Example 1. In addition, a broken line in the graph indicates from the volume resistivity after the previous removing step of an adhered deposit to the volume resistivity before the next removing step of an adhered deposit such that a change in the volume resistivity before and after removing the adhered deposit can be seen in Example 1.

As can be seen from the graph, in Example 1, the volume resistivity of the charging roll 70 after printing 250,000 sheets (250 kPV) is less than 10.5 [Ω·cm], and the target is satisfied.

Further, in Example 1, a change in the volume resistivity of the charging roll 70 after printing 250,000 sheets (250 kPV) is 0.1 [Ω·cm] as described in the table shown in FIG. 9, and the target is satisfied.

In addition, in Example 1, the thickness of a layer of an adhered deposit of the charging roll 70 after printing 250,000 sheets (250 kPV) is 0.0 [μm] as described in the table shown in FIG. 9. As described above, the thickness of the layer of the adhered deposit is less than 2.0 [μm], and the target is satisfied.

In addition, in Example 1, a grade of density unevenness of an output image after printing 250,000 sheets (250 kPV) is "A" as described in the table shown in FIG. 9. That is, density unevenness is a level acceptable for the product.

(2) Example 2

Evaluation Conditions

In Example 2, a threshold of the number of images is 5,000 sheets (5 kPV). That is, the removing member 72 is moved to the contact position for each of 5,000 sheets (5 kPV). A removal time is 60 [sec]. That is, a contact state of the removing member 72 is maintained for 60 [sec]. Other conditions are the same as in Example 1.

Evaluation Items

Evaluation items are the same as in Example 1.

Evaluation Results

A change in the volume resistivity of the charging roll 70 of Example 2 is described in the graph shown in FIG. 8. Specifically, a one-dot chain line in the graph indicates a change in the volume resistivity of the charging roll 70 of Example 2. As can be seen from the graph, in Example 2, the volume resistivity of the charging roll 70 after printing 250,000 sheets (250 kPV) is less than 10.5 [Ω·cm], and the target is satisfied.

Further, in Example 2, a change in the volume resistivity of the charging roll 70 after printing 250,000 sheets (250 kPV) is 0.5 [Ω·cm] as described in the table shown in FIG. 9, and the target is satisfied.

In addition, in Example 2, the thickness of a layer of an adhered deposit of the charging roll 70 after printing 250, 000 sheets (250 kPV) is 0.5 [μm] as described in the table shown in FIG. 9. As described above, the thickness of the layer of the adhered deposit is less than 2.0 [μm], and the target is satisfied.

In addition, in Example 2, a grade of density unevenness of an output image after printing 250,000 sheets (250 kPV) is "A" as described in the table shown in FIG. 9. That is, density unevenness is a level acceptable for the product.

(3) Example 3

Evaluation Conditions

In Example 3, a threshold of the number of images is 100 sheets (100 PV). That is, the removing member 72 is moved to the contact position for each of 100 sheets (100 PV). A removal time is 10 [sec]. That is, a contact state of the removing member 72 is maintained for 10 [sec]. Other conditions are the same as in Example 1.

Evaluation Items

Evaluation items are the same as in Example 1.

Evaluation Results

A change in the volume resistivity of the charging roll 70 of Example 3 is described in the graph shown in FIG. 8. Specifically, a two-dot chain line in the graph indicates a change in the volume resistivity of the charging roll 70 of Example 3. As can be seen from the graph, in Example 3, the volume resistivity of the charging roll 70 after printing 250,000 sheets (250 kPV) is less than 10.5 [Ω·cm], and the target is satisfied.

Further, in Example 3, a change in the volume resistivity of the charging roll 70 after printing 250,000 sheets (250 kPV) is 1.7 [Ω·cm] as described in the table shown in FIG. 9, and the target is satisfied.

In addition, in Example 3, the thickness of a layer of an adhered deposit of the charging roll 70 after printing 250,000 sheets (250 kPV) is 1.0 [μm] as described in the table shown in FIG. 9. As described above, the thickness of the layer of the adhered deposit is less than 2.0 [μm], and the target is satisfied.

In addition, in Example 3, a grade of density unevenness of an output image after printing 250,000 sheets (250 kPV) is "A" as described in the table shown in FIG. 9. That is, density unevenness is a level acceptable for the product.

(4) Comparative Example

Evaluation Conditions

In a comparative example, a state where the removing member 72 is moved to the contact position is maintained. That is, the removing member 72 is brought into contact with the charging roll 70 at all times.

Evaluation Items

Evaluation items are the same as in Example 1.

Evaluation Results

A change in the volume resistivity of the charging roll 70 of the comparative example is described in the graph shown in FIG. 8. Specifically, a dotted line in the graph indicates a change in the volume resistivity of the charging roll 70 of the comparative example. As can be seen from the graph, in the comparative example, the volume resistivity of the charging roll 70 after printing 250,000 sheets (250 kPV) is 10.5 [Ω·cm] or more, and the target is not satisfied.

Further, in the comparative example, a change in the volume resistivity of the charging roll 70 after printing 250,000 sheets (250 kPV) is 2.6 [Ω·cm] as described in the table shown in FIG. 9, and the target is not satisfied.

In addition, in the comparative example, the thickness of a layer of an adhered deposit of the charging roll 70 after printing 250,000 sheets (250 kPV) is 2.0 [μm] as described in the table shown in FIG. 9. As described above, the thickness of the layer of the adhered deposit is 2.0 [μm] or more, and the target is not satisfied.

In addition, in the comparative example, a grade of density unevenness of an output image after printing 250,000 sheets (250 kPV) is "C" as described in the table shown in FIG. 9. That is, density unevenness is not a level acceptable for the product.

Hereinafter, in the comparative example, a reason why the thickness of a layer of an adhered deposit of the charging roll 70 increases and the volume resistivity of the charging roll 70 increases will be considered.

The removing member 72 at the contact position removes an adhered deposit adhered to the charging roll 70 by rotating while following the charging roll 70. However, since the removing member 72 is arranged at the contact position at all times, the adhered deposit remaining on the charging roll 70 without being removed by the removing member 72 is pressed against the charging roll 70 by the removing member 72 and becomes a layer on the surface of the charging roll 70 so as to be fixed, and filming proceeds. Accordingly, in the comparative example, it is considered that the thickness of the adhered deposit of the charging roll 70 increases and the volume resistivity of the charging roll 70 increases.

Summary

As described above, in the charging device 22, the CPU 91 of the control unit 90 controls the moving member 80 to move the removing member 72 arranged at the separation position to the contact position at a time determined in advance and causes the removing member 72 to remove an adhered deposit adhered to the charging roll 70 only for a removal time. Accordingly, compared to a case where the removing member that rotates while following the charging roll is in contact with the charging roll at all times as in the comparative example, formation of a layer of the adhered deposit on the surface of the charging roll 70 is suppressed.

In addition, in the charging device 22, after the number of images from the previous removal of an adhered deposit has reached a number determined in advance, the removing member 72 arranged at the separation position is moved to the contact position, and the adhered deposit adhered to the charging roll 70 is removed by the removing member 72 only for a removal time. Accordingly, compared to a case where the adhered deposit is removed for each time determined in advance, formation of a layer of the adhered deposit on the surface of the charging roll 70 is effectively suppressed.

In addition, in the charging device 22, after the number of images from the previous removal of an adhered deposit has reached a number determined in advance and in a case of non-image formation, the removing member 72 arranged at the separation position is moved to the contact position, and the adhered deposit adhered to the charging roll 70 is removed by the removing member 72 only for a removal time. Accordingly, compared to a case where the removing member arranged at the separation position moves to the contact position in a case of image formation, rotation of the charging roll 70 in a case of image formation is stable, and thereby a decrease in image quality is suppressed. Herein, a case of non-image formation is a state where a print job is not executed.

In addition, as the image forming apparatus 10 includes the charging device 22, density unevenness of an output image is suppressed compared to a case of including the charging device in which the removing member is in contact with the charging roll at all times.

Second Exemplary Embodiment

Figure 10B:
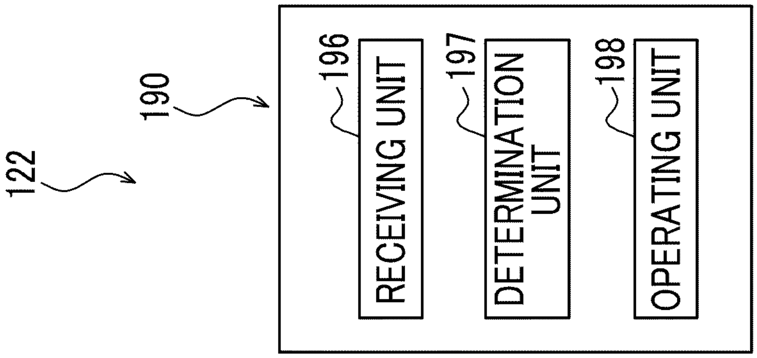
FIGS. 10A and 10B are diagrams showing a hardware configuration and a functional configuration of a control unit provided in a charging device according to a second exemplary embodiment of the present disclosure.

Next, an example of a charging device and an image forming apparatus according to a second exemplary embodiment will be described with reference to FIGS. 10A to 11. A portion of the second exemplary embodiment different from the first exemplary embodiment will be generally described.

Control Unit 190

Hardware Configuration of Control Unit 190

Figure 10A:
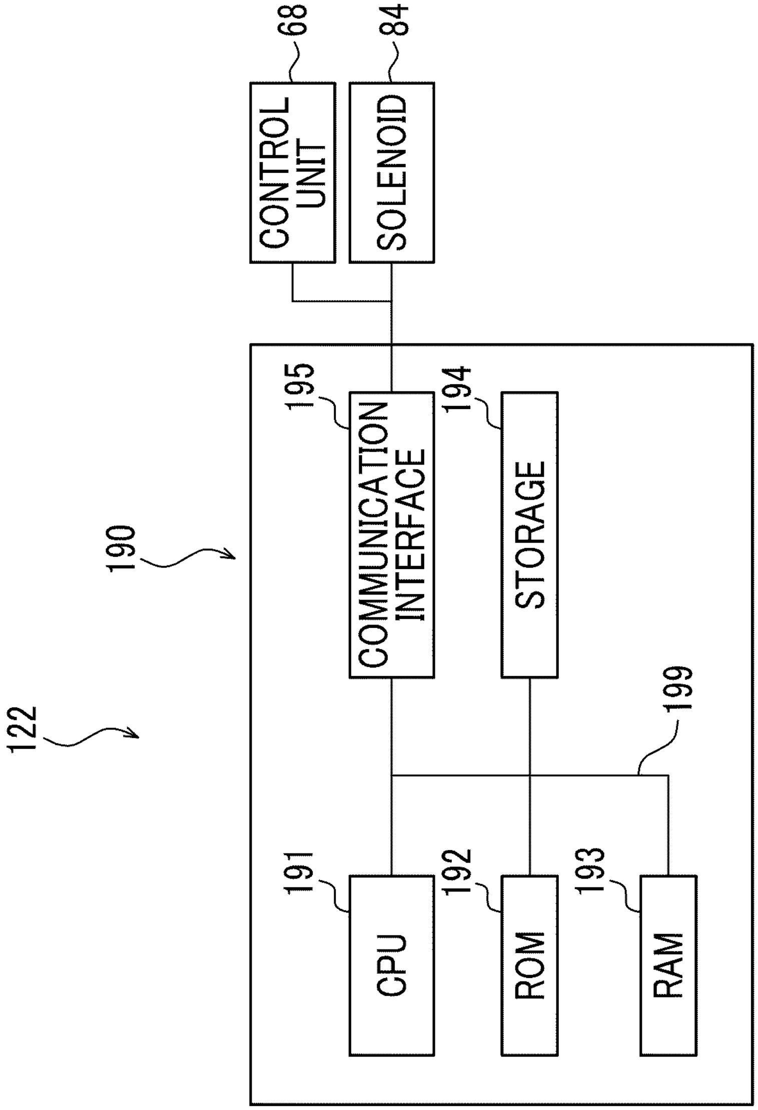
Figure 11:
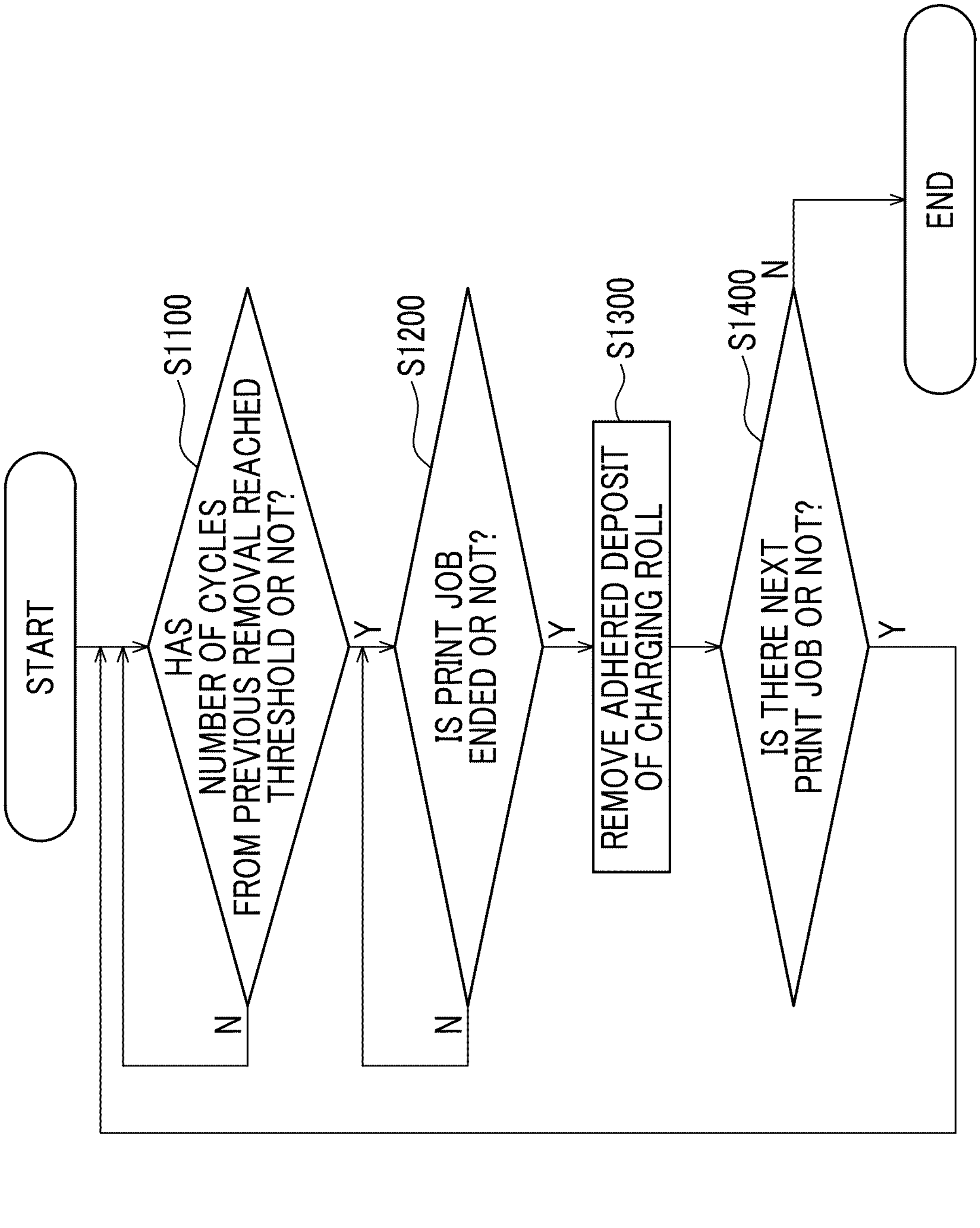
FIG. 11 is a flowchart showing a removing step of removing an adhered deposit adhered to a charging roll of the charging device according to the second exemplary embodiment of the present disclosure.

As shown in FIG. 10A, a control unit 190 of a charging device 122 of the second exemplary embodiment has a central processing unit (CPU) 191, a read only memory (ROM) 192, a random access memory (RAM) 193, a storage 194, and a communication interface (I/F) 195. In addition, the respective configurations are communicably connected to each other via a bus 199. The charging device 122 is an example of the charging system, and the CPU 191 is an example of the processor.

Functional Configuration of Control Unit 190

As shown in FIG. 10B, the control unit 190 has a receiving unit 196, a determination unit 197, and an operating unit 198. Each functional configuration is realized by causing the CPU 191 to read and execute a drive program stored in the ROM 192 or the storage 194. Details of the control unit 190 will be described together with action to be described later.

Action of Major Portion Configuration

Next, a removing step of removing an adhered deposit adhered to the charging roll 70 using the removing member 72 will be described with reference to a flowchart of FIG. 11.

In a case where the receiving unit 196 of the control unit 190 receives information of a print job to be executed by the image forming apparatus 10 from now on from the control unit 68 of the image forming apparatus 10, in step S1100, the determination unit 197 of the control unit 190 determines whether or not the number of cycles (number of rotations) of the image holding body 21 from the previous removal reaches a threshold based on the information of the print job.

Specifically, the determination unit 197 determines whether or not the number of cycles of the image holding body 21 reaches a threshold in a case where a received print job is executed after the removing member 72 moves to the contact position and removes an adhered deposit of the charging roll 70. In the present exemplary embodiment, for example, a threshold of the number of cycles of the image holding body 21 is 200,000 [cycle]. That is, the determination unit 197 determines whether or not the cumulation of the number of cycles of the image holding body 21 reaches 200,000 [cycle] (200 kcycle) in a case where the received print job is executed after the removing member 72 moves to the contact position and removes the adhered deposit of the charging roll 70.

In a case where the number of cycles of the image holding body 21 reaches 200,000 [cycle] (200 kcycle), processing proceeds to step S1200, and in a case where the number of cycles of the image holding body 21 does not reach 200,000 [cycle] (200 kcycle), step S1100 is executed again.

In step S1200, the receiving unit 196 receives operating information of the image forming apparatus 10 from the control unit 68 of the image forming apparatus 10, and the determination unit 197 determines whether or not the print job has ended. In a case where the print job ends, processing proceeds to step S1300, and in a case where the print job is not ended, step S1200 is executed again.

In step S1300, the operating unit 198 energizes the solenoid 84, and the removing member 72 at the separation position (see FIG. 5B) is moved to the contact position (see FIG. 5A) only for a time determined in advance. The removing member 72 moved to the contact position rotates while following the rotating charging roll 70 and scrapes off and removes an adhered deposit adhered to the charging roll 70. In the present exemplary embodiment, for example, a time determined in advance for the number of images is 120 [sec]. That is, a removal time for removing the adhered deposit is 120 [sec]. In a case where 120 [sec] is reached after the removing member 72 moves to the contact position, the operating unit 198 brings the solenoid 84 into a non-energized state and moves the removing member 72 at the contact position (see FIG. 5A) to the separation position (see FIG. 5B). In a case where the removing member 72 moves to the separation position, processing proceeds to step S1400.

In step S1400, the receiving unit 196 receives presence or absence information of a print job to be executed by the image forming apparatus 10 from now on from the control unit 68 of the image forming apparatus 10. In a case where there is a print job, processing returns to step S1100 again, and the step described above is executed. On the other hand, in a case where there is no print job, an operation of an example is ended.

Actual Device Test

The following actual device test is conducted using DocuCentre-VI C7771 manufactured by FUJIFILM Business Innovation Corp. Hereinafter, conditions, evaluation items, and evaluation results of the actual device test will be described.

(1) Example 4

Evaluation Conditions

In Example 4, a threshold of the number of cycles of the image holding body 21 is 200,000 [cycle] (200 kcycle).

That is, the removing member 72 is moved to the contact position every 200,000 [cycle] (200 kcycle).

A removal time is 120 [sec]. That is, a contact state of the removing member 72 is maintained for 120 [sec]. Other conditions are the same as in Example 1.

Evaluation Items

Evaluation items are the same as in Example 1.

Evaluation Results

Further, in Example 4, a change in the volume resistivity of the charging roll 70 after printing 250,000 sheets (250 kPV) is 0.2 [Ω·cm] as described in the table shown in FIG. 9, and the target is satisfied.

In addition, in Example 4, the thickness of a layer of an adhered deposit of the charging roll 70 after printing 250,000 sheets (250 kPV) is 0.2 [μm] as described in the table shown in FIG. 9. As described above, the thickness of the layer of the adhered deposit is less than 2.0 [μm], and the target is satisfied.

In addition, in Example 4, a grade of density unevenness of an output image after printing 250,000 sheets (250 kPV) is "A" as described in the table shown in FIG. 9. That is, density unevenness is a level acceptable for the product.

Summary

As described above, in the charging device 122, after the number of cycles of the image holding body 21 from the previous removal of an adhered deposit has reached a number determined in advance, the removing member 72 arranged at the separation position is moved to the contact position, and the adhered deposit adhered to the charging roll 70 is removed by the removing member 72 only for a removal time. Accordingly, compared to a case where the adhered deposit is removed for each time determined in advance, formation of a layer of the adhered deposit on the surface of the charging roll 70 is effectively suppressed.

In addition, in the charging device 122, after the number of cycles of the image holding body 21 from the previous removal of an adhered deposit has reached a number determined in advance and in a case of non-image formation, the removing member 72 arranged at the separation position is moved to the contact position, and the adhered deposit adhered to the charging roll 70 is removed by the removing member 72 only for a removal time. Accordingly, compared to a case where the removing member arranged at the separation position moves to the contact position in a case of image formation, rotation of the charging roll 70 in a case of image formation is stable, and thereby a decrease in image quality is suppressed.

Third Exemplary Embodiment

Next, an example of a charging device and an image forming apparatus according to a third exemplary embodiment will be described with reference to FIGS. 12 to 13B. A portion of the third exemplary embodiment different from the first exemplary embodiment will be generally described.

Figure 12:
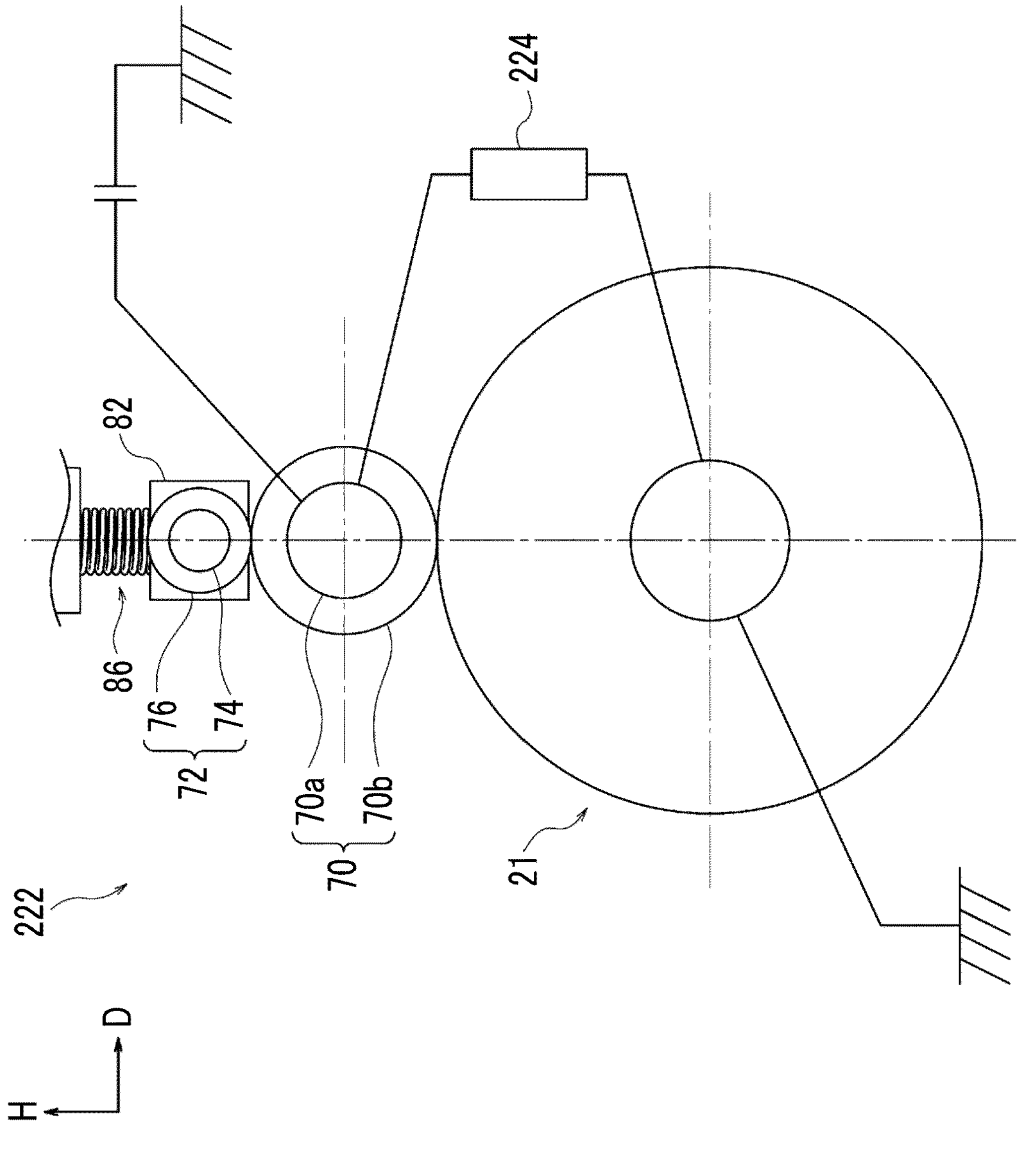
FIG. 12 is a configuration view showing a charging device according to a third exemplary embodiment of the present disclosure.

As shown in FIG. 12, a charging device 222 according to the third exemplary embodiment includes a resistance detector 224 that detects an electrical resistance between the charging roll 70 and the image holding body 21. The charging device 222 is an example of the charging system, and the resistance detector 224 is an example of a detection unit.

Control Unit 290

Hardware Configuration of Control Unit 290

Figure 13B:
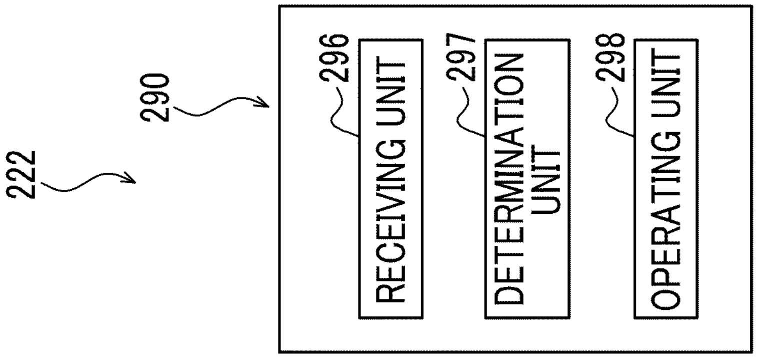
FIGS. 13A and 13B are diagrams showing a hardware configuration and a functional configuration of a control unit provided in the charging device according to the third exemplary embodiment of the present disclosure.
Figure 13A:
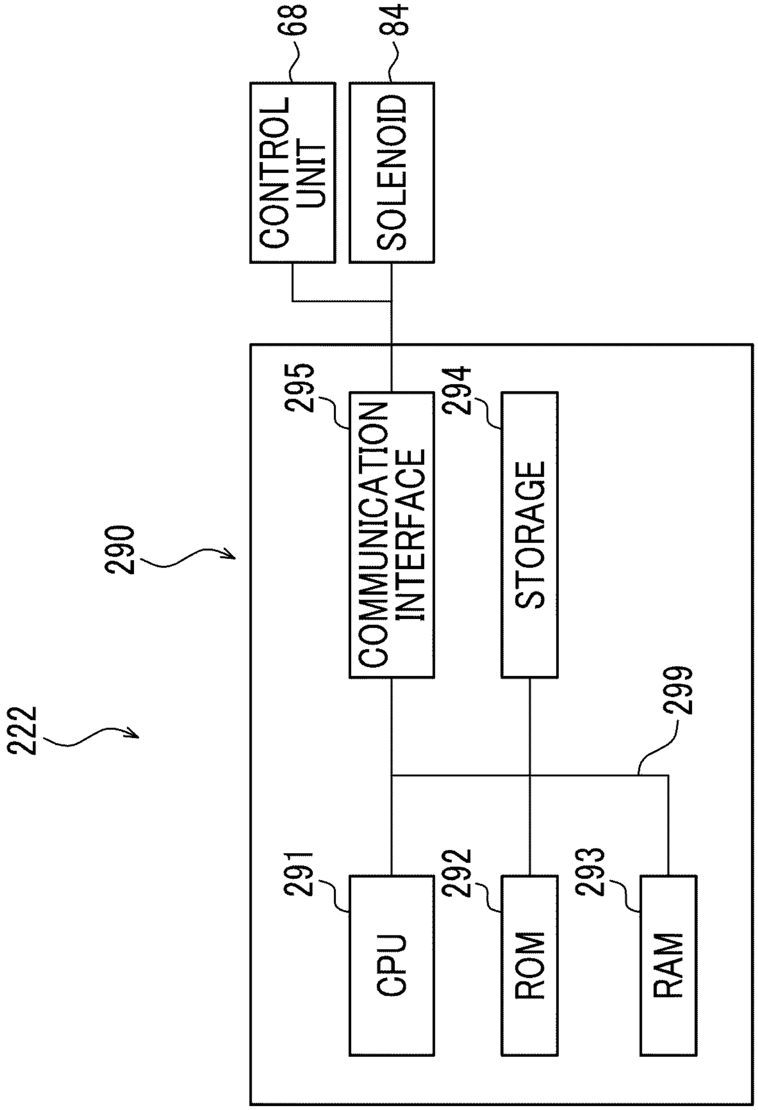

As shown in FIG. 13A, a control unit 290 of the charging device 222 has a central processing unit (CPU) 291, a read only memory (ROM) 292, a random access memory (RAM) 293, a storage 294, and a communication interface (I/F) 295. In addition, the respective configurations are communicably connected to each other via a bus 299. The CPU 291 is an example of the processor.

Functional Configuration of Control Unit 290

As shown in FIG. 13B, the control unit 290 has a receiving unit 296, a determination unit 297, and an operating unit 298. Each functional configuration is realized by causing the CPU 291 to read and execute a drive program stored in the ROM 292 or the storage 294. Details of the control unit 290 will be described together with action to be described later.

Action of Major Portion Configuration

Figure 14:
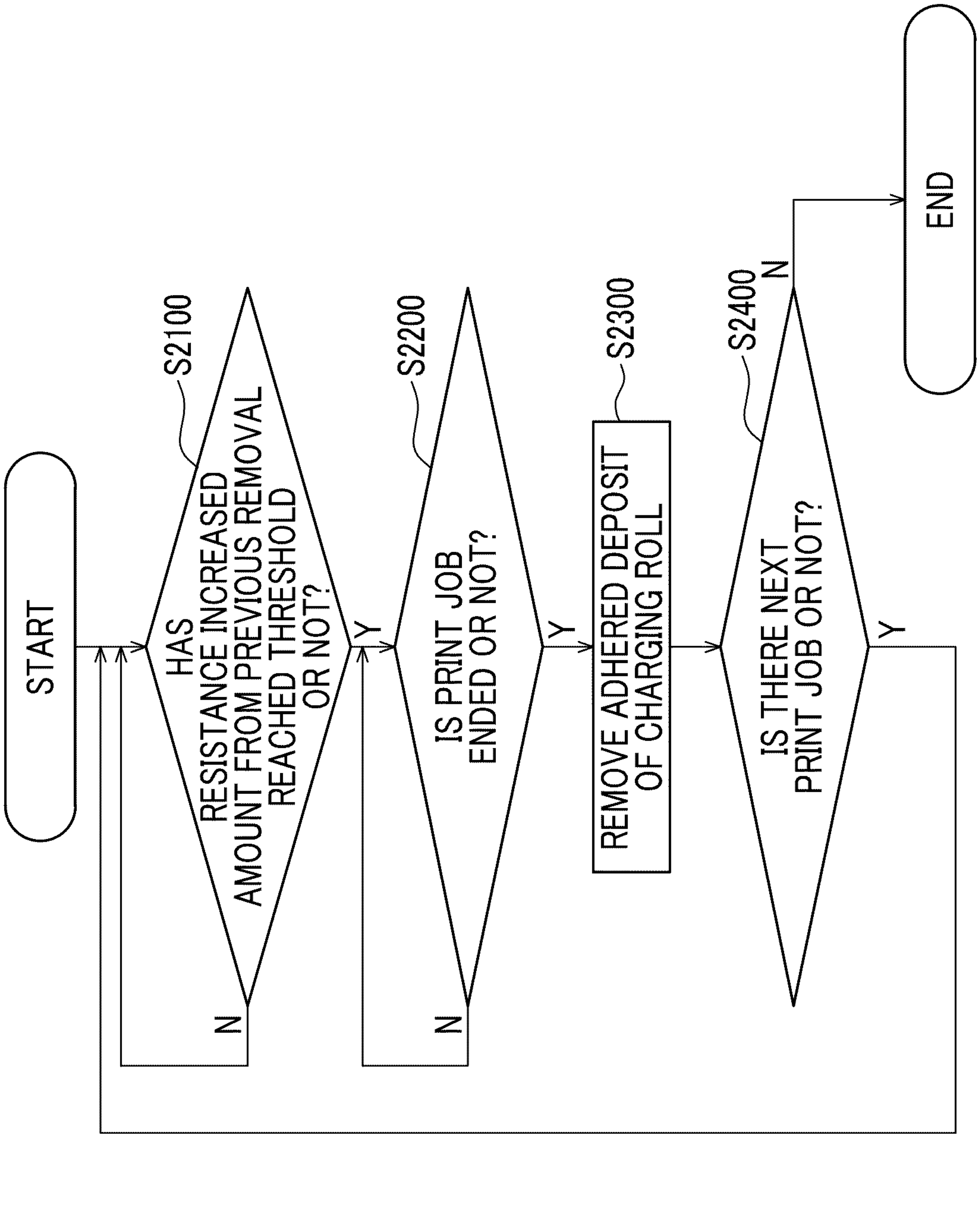
FIG. 14 is a flowchart showing a removing step of removing an adhered deposit adhered to a charging roll of the charging device according to the third exemplary embodiment of the present disclosure.

Next, a removing step of removing an adhered deposit adhered to the charging roll 70 using the removing member 72 will be described with reference to a flowchart of FIG. 14.

The receiving unit 296 of the control unit 290 receives information of a print job to be executed by the image forming apparatus 10 from now on from the control unit 68 of the image forming apparatus 10. In a case where an electrical resistance between the charging roll 70 and the image holding body 21 after the previous removal of an adhered deposit is received from the resistance detector 224, in step S2100, the receiving unit 296 monitors the electrical resistance detected from the resistance detector 224 in a case of image formation, and the determination unit 297 determines whether or not the electrical resistance from the previous removal has increased by an amount determined in advance based on the monitored electrical resistance.

Specifically, the determination unit 297 determines whether or not an increased amount of the electrical resistance reaches a threshold after the removing member 72 moves to the contact position and removes an adhered deposit of the charging roll 70. In the present exemplary embodiment, a threshold of the increased amount of the electrical resistance is, for example, 1.0 [log Ω]. That is, the determination unit 297 determines whether or not the increased amount of the electrical resistance has reached 1.0 [log Ω] after the removing member 72 moves to the contact position and removes the adhered deposit of the charging roll 70. In a case where the increased amount of the electrical resistance has reached 1.0 [log Ω], processing proceeds to step S2200, and in a case where the increased amount of the electrical resistance has not reached 1.0 [log Ω], step S2100 is executed again.

In step S2200, the receiving unit 296 receives operating information of the image forming apparatus 10 from the control unit 68 of the image forming apparatus 10, and the determination unit 297 determines whether or not the print job has ended. In a case where the print job ends, processing proceeds to step S2300, and in a case where the print job is not ended, step S2200 is executed again.

In step S2300, the operating unit 298 energizes the solenoid 84, and the removing member 72 at the separation position (see FIG. 5B) is moved to the contact position (see FIG. 5A) only for a time determined in advance. The removing member 72 moved to the contact position rotates while following the rotating charging roll 70 and scrapes off and removes an adhered deposit adhered to the charging roll 70. In the present exemplary embodiment, for example, a time determined in advance for the number of images is 60 [sec]. That is, a removal time for removing the adhered deposit is 60 [sec]. In a case where 60 [sec] is reached after the removing member 72 moves to the contact position, the operating unit 298 brings the solenoid 84 into a non-energized state and moves the removing member 72 at the contact position (see FIG. 5A) to the separation position (see FIG. 5B). In a case where the removing member 72 moves to the separation position, processing proceeds to step S2400.

In step S2400, the receiving unit 296 receives presence or absence information of a print job to be executed by the image forming apparatus 10 from now on from the control unit 68 of the image forming apparatus 10. In a case where there is a print job, processing returns to step S2100 again, and the step described above is executed. On the other hand, in a case where there is no print job, an operation of an example is ended.

Although the removal time is 60 [sec] in step S2300, the control unit 290 derives a difference in the electrical resistance before and after removal of an adhered deposit, and in a case where the difference in the electrical resistance is small, the next removal time may be long compared to a case where the difference in the electrical resistance is large. Accordingly, compared to a case where the removal time is the same at all times, the adhered deposit adhered to the charging roll 70 is effectively removed.

Actual Device Test

The following actual device test is conducted using DocuCentre-VI C7771 manufactured by FUJIFILM Business Innovation Corp. Hereinafter, specifications, evaluation items, and evaluation results of the actual device test will be described.

(1) Example 5

Evaluation Conditions

In Example 5, a threshold of an increased amount in an electrical resistance is 1.0 [log Ω]. That is, the removing member 72 is moved to the contact position each time the electrical resistance increased by 1.0 [log Ω]. A removal time is 60 [sec]. That is, a contact state of the removing member 72 is maintained for 60 [sec]. Other conditions are the same as in Example 1.

Evaluation Items

Evaluation items are the same as in Example 1.

Evaluation Results

In Example 5, a change in the volume resistivity of the charging roll 70 after printing 250,000 sheets (250 kPV) is 0.4 [Ω·cm] as described in the table shown in FIG. 9, and the target is satisfied.

In addition, in Example 5, the thickness of a layer of an adhered deposit of the charging roll 70 after printing 250,000 sheets (250 kPV) is 0.4 [μm] as described in the table shown in FIG. 9. As described above, the thickness of the layer of the adhered deposit is less than 2.0 [μm], and the target is satisfied.

In addition, in Example 5, a grade of density unevenness of an output image after printing 250,000 sheets (250 kPV) is “A” as described in the table shown in FIG. 9. That is, density unevenness is a level acceptable for the product.

Summary

As described above, in the charging device 222, after the electrical resistance has increased by the amount determined in advance from the previous removal of an adhered deposit, the removing member 72 arranged at the separation position is moved to the contact position, and the adhered deposit adhered to the charging roll 70 is removed by the removing member 72 only for a removal time. Accordingly, compared to a case where the adhered deposit is removed for each time determined in advance, formation of a layer of the adhered deposit on the surface of the charging roll 70 is effectively suppressed.

In addition, in the charging device 222, after the electrical resistance from the previous removal of an adhered deposit has increased by the amount determined in advance and in a case of non-image formation, the removing member 72 arranged at the separation position is moved to the contact position, and the adhered deposit adhered to the charging roll 70 is removed by the removing member 72 only for a removal time. Accordingly, compared to a case where the removing member arranged at the separation position moves to the contact position in a case of image formation, rotation of the charging roll 70 is stable in a case of image formation, and thereby a decrease in image quality is suppressed.

Although details of a certain exemplary embodiment of the present disclosure have been described in detail, the present disclosure is not limited to such an exemplary embodiment, and it is clear for those skilled in the art that the present disclosure can take other various exemplary embodiments within the scope of the present disclosure. For example, although a removing operation of removing an adhered deposit has been executed in a case of non-image formation in the exemplary embodiments, the removing operation of removing the adhered deposit may be executed in a case of image formation. However, in this case, action achieved by removing the adhered deposit in a case of non-image formation is not achieved.

In addition, although not particularly described in the exemplary embodiments, the removing operation may be executed at each time determined in advance. However, in this case, action achieved by performing the removing operation based on the number of images, the number of cycles of the image holding body 21, or the increased amount of the electrical resistance is not achieved.

In addition, the threshold of the number of images described in the first exemplary embodiment is merely an example, and other thresholds may be used.

In addition, the threshold of the number of cycles of the image holding body 21 described in the second exemplary embodiment is merely an example, and other thresholds may be used.

In addition, the threshold of the increased amount of the electrical resistance described in the third exemplary embodiment is merely an example, and other thresholds may be used.

In addition, although the removal time is described as an example in the exemplary embodiments, an actual removal time may be shorter and may be longer than the described removal time.

In addition, although the control units 90, 190, and 290 of the charging devices 22, 122, and 222 are provided separately from the control unit 68 of the image forming apparatus 10 in the exemplary embodiments, the control unit of the charging device may configure a part of the control unit 68 of the image forming apparatus 10.

In addition, although not particularly described in the exemplary embodiments, the charging devices 22, 122, and 222 and the image forming apparatus 10 may be configured by a single device or may be configured by a plurality of devices.

(((1)))

A charging system comprising:

- a charging member that rotates while following a rotating image holding body and that charges the image holding body;
- a removing member that rotates while following the rotating charging member in a state of being arranged at a contact position in contact with the charging member and that removes an adhered deposit adhered to the charging member;
- a moving member that moves the removing member to a separation position separated from the charging member and the contact position; and
- at least one processor,
- wherein the processor is configured to:
  - cause the removing member to remove the adhered deposit adhered to the charging member only for a removal time by controlling the moving member to move the removing member arranged at the separation position to the contact position at a time determined in advance.

(((2)))

The charging system according to (((1))), wherein the processor is configured to: cause the removing member to remove the adhered deposit adhered to the charging member only for the removal time by moving the removing member arranged at the separation position to the contact position after the number of images formed on the image holding body from previous removal of the adhered deposit has reached a number determined in advance.

(((3)))

The charging system according to (((1))) or (((2))), wherein the processor is configured to:

- move the removing member arranged at the separation position to the contact position after the number of images from previous removal of the adhered deposit has reached a number determined in advance and in a case of non-image formation.

(((4)))

The charging system according to (((1))), wherein the processor is configured to:

cause the removing member to remove the adhered deposit adhered to the charging member only for the removal time by moving the removing member arranged at the separation position to the contact position after the number of cycles of the image holding body from previous removal of the adhered deposit has reached a number determined in advance.

(((5)))

The charging system according to (((1))) or (((4))), wherein the processor is configured to:

move the removing member arranged at the separation position to the contact position after the number of cycles from previous removal of the adhered deposit has reached a number determined in advance and in a case of non-image formation.

(((6)))

The charging system according to (((1))), further comprising:

a detection unit that detects an electrical resistance between the charging member and the image holding body, wherein the processor is configured to:

cause the removing member to remove the adhered deposit adhered to the charging member only for the removal time by moving the removing member arranged at the separation position to the contact position after the electrical resistance from previous removal of the adhered deposit has increased by an amount determined in advance.

(((7)))

The charging system according to (((1))) or (((6))), wherein the processor is configured to:

move the removing member arranged at the separation position to the contact position after an increased amount of an electrical resistance from previous removal of the adhered deposit has reached a threshold determined in advance and in a case of non-image formation.

(((8)))

The charging system according to (((6))) or (((7))), wherein the processor is configured to:

derive a difference in the electrical resistance before and after removal of the adhered deposit; and make the next removal time long in a case where the difference in the electrical resistance is small, compared to a case where the difference in the electrical resistance is large.

(((9)))

An image forming system comprising:

the charging system according to any one of (((1))) to (((8)));

an image holding body that is charged by the charging system and on which an image is formed; and a transfer device that transfers the image formed on the image holding body to a recording medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging system comprising:

a charging member that rotates while following a rotating image holding body and that charges the image holding body;

a removing member that rotates while following the rotating charging member in a state of being arranged at a contact position in contact with the charging member and that removes an adhered deposit adhered to the charging member;

a moving member that moves the removing member to a separation position separated from the charging member and the contact position; and at least one processor, wherein the processor is configured to:

cause the removing member to remove the adhered deposit adhered to the charging member only for a removal time by controlling the moving member to move the removing member arranged at the separation position to the contact position at a time determined in advance, and cause the removing member to remove the adhered deposit adhered to the charging member only for the removal time by moving the removing member arranged at the separation position to the contact position after the number of images formed on the image holding body from previous removal of the adhered deposit has reached a number determined in advance.

2. The charging system according to claim 1, wherein the processor is configured to:

move the removing member arranged at the separation position to the contact position after the number of images from previous removal of the adhered deposit has reached a number determined in advance and in a case of non-image formation.

3. An image forming system comprising:

the charging system according to claim 2;

an image holding body that is charged by the charging system and on which an image is formed; and a transfer device that transfers the image formed on the image holding body to a recording medium.

4. An image forming system comprising:

the charging system according to claim 1;

an image holding body that is charged by the charging system and on which an image is formed; and a transfer device that transfers the image formed on the image holding body to a recording medium.

5. A charging system comprising:

a charging member that rotates while following a rotating image holding body and that charges the image holding body;

a removing member that rotates while following the rotating charging member in a state of being arranged at a contact position in contact with the charging member and that removes an adhered deposit adhered to the charging member;

a moving member that moves the removing member to a separation position separated from the charging member and the contact position; and at least one processor, wherein the processor is configured to:

cause the removing member to remove the adhered deposit adhered to the charging member only for a removal time by controlling the moving member to move the removing member arranged at the separation position to the contact position at a time determined in advance, and cause the removing member to remove the adhered deposit adhered to the charging member only for the removal time by moving the removing member arranged at the separation position to the contact position after the number of cycles of the image holding body from previous removal of the adhered deposit has reached a number determined in advance.

6. The charging system according to claim 5, wherein the processor is configured to:

move the removing member arranged at the separation position to the contact position after the number of cycles from previous removal of the adhered deposit has reached a number determined in advance and in a case of non-image formation.

7. An image forming system comprising:

the charging system according to claim 6;

an image holding body that is charged by the charging system and on which an image is formed; and a transfer device that transfers the image formed on the image holding body to a recording medium.

8. An image forming system comprising:

the charging system according to claim 5;

an image holding body that is charged by the charging system and on which an image is formed; and a transfer device that transfers the image formed on the image holding body to a recording medium.

9. A charging system comprising:

a charging member that rotates while following a rotating image holding body and that charges the image holding body;

a removing member that rotates while following the rotating charging member in a state of being arranged at a contact position in contact with the charging member and that removes an adhered deposit adhered to the charging member;

a moving member that moves the removing member to a separation position separated from the charging member and the contact position;

at least one processor; and a detection unit that detects an electrical resistance between the charging member and the image holding body, wherein the processor is configured to:

cause the removing member to remove the adhered deposit adhered to the charging member only for a removal time by controlling the moving member to move the removing member arranged at the separation position to the contact position at a time determined in advance, and cause the removing member to remove the adhered deposit adhered to the charging member only for the removal time by moving the removing member arranged at the separation position to the contact position after the electrical resistance from previous removal of the adhered deposit has increased by an amount determined in advance.

10. The charging system according to claim 9, wherein the processor is configured to:

move the removing member arranged at the separation position to the contact position after an increased amount of an electrical resistance from previous removal of the adhered deposit has reached a threshold determined in advance and in a case of non-image formation.

11. An image forming system comprising:

the charging system according to claim 10;

an image holding body that is charged by the charging system and on which an image is formed; and a transfer device that transfers the image formed on the image holding body to a recording medium.

12. The charging system according to claim 9, wherein the processor is configured to:

derive a difference in the electrical resistance before and after removal of the adhered deposit; and make the next removal time long in a case where the difference in the electrical resistance is small, compared to a case where the difference in the electrical resistance is large.

13. An image forming system comprising:

the charging system according to claim 12;

an image holding body that is charged by the charging system and on which an image is formed; and a transfer device that transfers the image formed on the image holding body to a recording medium.

14. An image forming system comprising:

the charging system according to claim 9;

an image holding body that is charged by the charging system and on which an image is formed; and a transfer device that transfers the image formed on the image holding body to a recording medium.

* * * * *